United States Patent [19]

Ingalls

[11] 3,789,460
[45] Feb. 5, 1974

[54] CRAWFISH PEELER

[76] Inventor: Edgar J. Ingalls, Kendalwood Rd., Baton Rouge, La. 70815

[22] Filed: Jan. 19, 1972

[21] Appl. No.: 218,871

[52] U.S. Cl. ................................................. 17/73
[51] Int. Cl. ........................................... A22c 29/00
[58] Field of Search ................................. 17/73, 45

[56] References Cited
UNITED STATES PATENTS

| | | | |
|---|---|---|---|
| 3,466,699 | 9/1969 | Willis et al. | 17/73 |
| 3,634,909 | 1/1972 | Matthiesen | 17/73 |
| 3,383,734 | 5/1968 | Lapeyre | 17/73 |
| 3,084,379 | 4/1963 | Henning | 17/73 X |

*Primary Examiner*—Louis G. Mancene
*Assistant Examiner*—D. L. Weinhold
*Attorney, Agent, or Firm*—Richard E. Babcock, Jr.

[57] ABSTRACT

Pairs of grippers for operative engagement with the tail and head ends, respectively, of a crawfish are supported for movement in synchronized relation through separate but tangentially related orbits wherein both pairs of grippers simultaneously move in a common direction through or past the point of tangency of their respective orbits. Thus a crawfish, the tail of which is placed in the tail grippers with its head projecting therefrom, will be carried toward the point of tangency to place its head in the head grippers, which will then be closed approximately at the point of tangency to then remove the head during continued movement of both pairs of grippers through and past the point of tangency, leaving the meat within the portion retained in the tail grippers. A nozzle which penetrates the tail section of the shell, then injects a blast of air into the shell to eject the meat. The deveining pin on which the shell and meat are impaled when initially placed in the tail grippers, functions to open and remove the sand vein from the crawfish incident to its ejection under the influence of the air blast. During continuance of their rotation, and before again approaching the point of tangency, the tail grippers are opened to release the empty shell segment therefrom and to receive a fresh crawfish. The head grippers are similarly opened to discharge the head.

6 Claims, 7 Drawing Figures

CRAWFISH PEELER

This invention relates to a machine for automatically removing the edible meat from the shells of crawfish and other crustaceans.

In recent years, crawfish have become increasingly popular as human food because of their attractive flavor and nutritive value. One of the primary limitations on their increased use has been simply the lack of any suitable automatic mechanism for removing the meat from the shells. The difficulty of devising a suitable mechanism has been complicated by the tendency of meats to cling firmly to the tail sections of the shells.

In accordance with the present invention, this last mentioned tendency is employed to advantage in a machine in which the head and tail ends of a crustacean are placed between the different pairs of grippers which are carried in separate tangently related orbits in which the movement of the pairs of grippers are synchronized so that both pairs of grippers move simultaneously through and past the point of tangency of their respective orbits to grip and pull apart the head and tail ends, leaving the meat within the tail end for subsequent removal as the pairs of grippers then move in divergent paths.

In a co-pending application I have disclosed a mechanism for the same purpose in which the crawfish are placed simultaneously between pairs of grippers which engage their opposite ends and pull them apart to leave the meat retained in the tail end or section by virtue of its tendency to cling to that end as the pairs of grippers move apart after passing through their point of tangencies.

In accordance with the present invention, however, the tail end of the crawfish is initially positioned between the tail grippers, which are then closed before the said grippers arrive at the point of tangency, leaving the head of the crawfish projecting therefrom for reception between the still open head-grippers, which are closed substantially at the point of tangency, whereby the crawfish will be deheaded by the still closed grippers of both pairs incident of their relative divergent movement after passing the point of tangency. The meat is thus drawn from the head and is retained in the tail end, from which it is thereafter ejected by pressurized fluid injected into the tail end of the shell. Such injection of fluid in the preferred embodiment is accomplished by a nozzle or hollow probe which penetrates the shell adjacent its tail end and through which a blast of pressurized fluid is delivered at the proper time. Airblasts also are employed thereafter to eject the empty shell sections from between the head and tail grippers at appropriate points in their respective orbits.

The preferred embodiment of the invention is illustrated in detail in the accompanying drawings in which.

Figure 1:
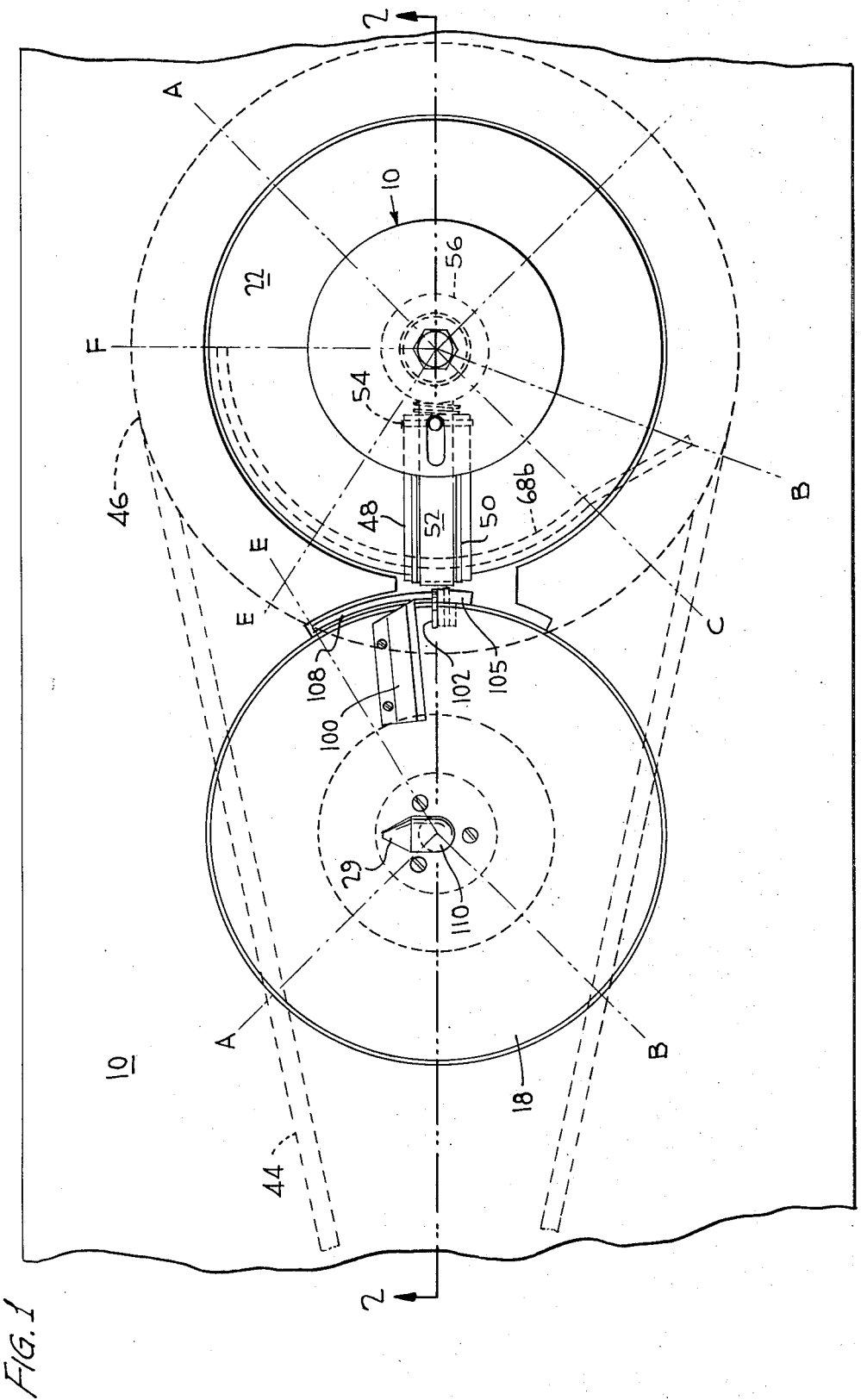
FIG. 1 is a plan view of a crawfish peeling machine in accordance with the invention.

In the preferred embodiment of the invention certain of the working parts are enclosed within a combined housing and frame structure of generally rectilinear shape in plan, (FIGS. 1 and 2) including the generally horizontally disposed flat top plate 10 and vertical side and end walls 12 and 14, respectively, supported at the corners by the legs 16.

Supported for rotation about vertical axes in the housing are two oppositely rotating rotors for acting respectively on the head section and the tail section of the crawfish, and hereinafter referred to for purposes of convenience as the head rotor and the tail rotor.

The head rotor comprises a flat substantially rigid disk 18 fixedly supported at the upper end of a tubular vertical shaft 20 for rotation coaxially therewith. The tail disk 22 is of similar diameter of the head disk and similarly is supported at the upper end of the tubular vertical shaft 24 for rotation therewith.

Preferably the disks 18 and 22 are supported for rotation closely adjacent to each other within conformingly shaped preferably interconnected circular openings within the horizontal top plate 10 and in a common plane with such plate 10.

For rotatably supporting the shafts 20 and 24, there are fixedly supported within the housing a pair of relatively spaced rigid horizontal support plates 26 and 28, respectively, through openings in which the shafts 20 and 24 extend, the shaft 20 being journalled in bearings 30 and 32, respectively, and the shaft 24, similarly, being rotatably supported in the bearings 34 and 36.

Suitable means interconnect the rotors for equal but opposite angular movement in synchronized relation as exemplified by the spur gears 38 and 39, respectively, affixed to the shafts 20 and 24 between the support plates 26 and 28.

For producing a constant rotary movement of the disks 18 and 22, there may be provided a conventional electric drive motor 40, the output of which is transmitted through conventional reduction gearing 41 to a drive sheave 42. The drive sheave 42, in turn, is operatively connected by a flexible belt 44 to the driven sheave 46 keyed on or otherwise affixed to the lower end of the tubular shaft 24 of disk 22.

The primary crawfish peeling and handling mechanism which is carried by the tail rotor disk 22 comprises the lower gripper or receiver 48 formed with an upwardly and radially outwardly opening recess 50 within which the tail end or section of the crawfish is to be manually positioned at the beginning of each operative cycle of the mechanism, with the head end or section of the crawfish projecting radially outwardly from the receiver 48 and its associated disk 22.

Associated with the lower gripper or receiver 48, for clamping engagement with the tail section of a crawfish positioned within the recess 50 is the movable upper gripper 52, preferably provided with a resilient work engaging pad 52' on its lower face for cushioning gripping engagement with the crawfish.

In the instant embodiment, the upper gripper 52 is pivotally connected at 54 to the upwardly projecting rear or inner end 48a of the receiver 48.

The entire gripper assembly, consisting of the lower gripper or receiver 48 and its cooperating upper gripper 52, is disposed for radial movement on the disk 22 in properly coordinated synchronized relation to the rotary movement of the disk. Such radial movement of the gripper assembly in the instant invention is relied upon for actuating and releasing the grippers, as well as for other important functions hereinafter to be described.

For guiding the receiver 48 in its radial movement, a generally cylindrical hub 56 coaxially affixed to the disk 22 has affixed thereto a radially projecting arm 58 which is slidably received through an opening in the rear end portion 48a of the receiver. In addition, the radially outward end of the receiver preferably is constrained to radial movement by means of a guide 60, supported beneath the receiver 48 by means of the screw 62 for radial movement in a slot or radial notch 61 in the disk.

Radial outward movement of the grippers 48, 52 is produced by a coil spring 64 which encircles the radial arm 58 and is under compression between the hub 56 and the rear end 48a of the lower gripper 48.

Radial inward or retraction movement and positioning of the grippers 48, 52 is controlled by a cam follower, here shown in the form of a roller 66 journalled on the lower end of the screw 62, for radial outward thrusting operative engagement with radially inner surface of a cam track 68 having interconnected sectors 68a and 68b, respectively, arranged eccentrically to the rotor axis and concentrically thereto. It will be noted that the eccentric sector 68a of the cam track is of decreasing radius in a counter-clockwise direction or, in other words, in the direction of rotation of the disk 22 as indicated by the arrow in FIG. 1, while the sector 68b extends in a counter-clockwise direction from the radially innermost end of the eccentric sector 68a.

Thus, as the upper and lower tail grippers 52 and 50 rotate in clockwise direction with the disk 22, it will be seen that these grippers will be repeatedly radially retracted by cooperation of the cam means, namely the cam follower 66 and the cam track 68, and retained in retracted position through a predetermined portion of each rotation of the disk 22.

Figure 3:
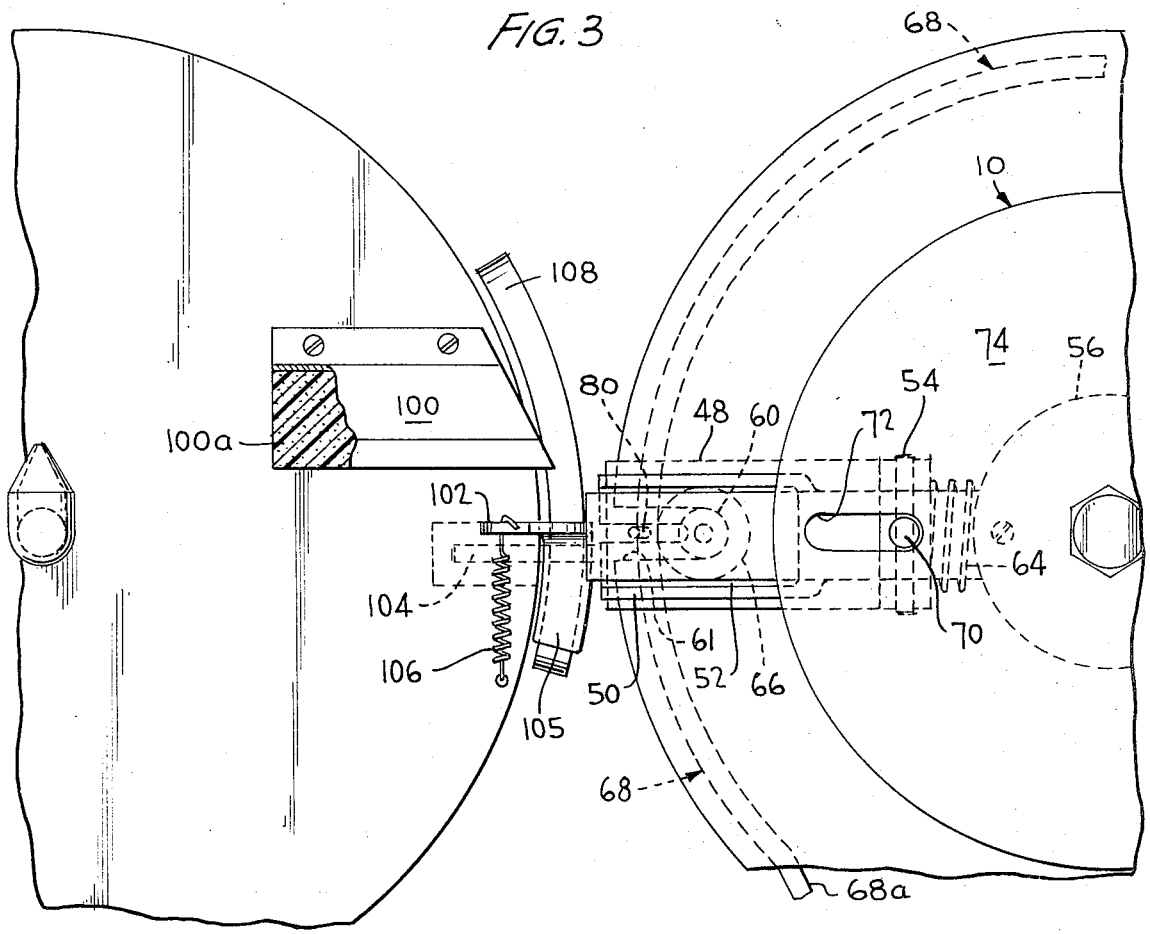
FIG. 3 is an enlarged fragmentary diagrammatic view of the cooperating pairs of grippers and the means carrying them for movement through their respective orbits in synchronized relation.
Figure 4:
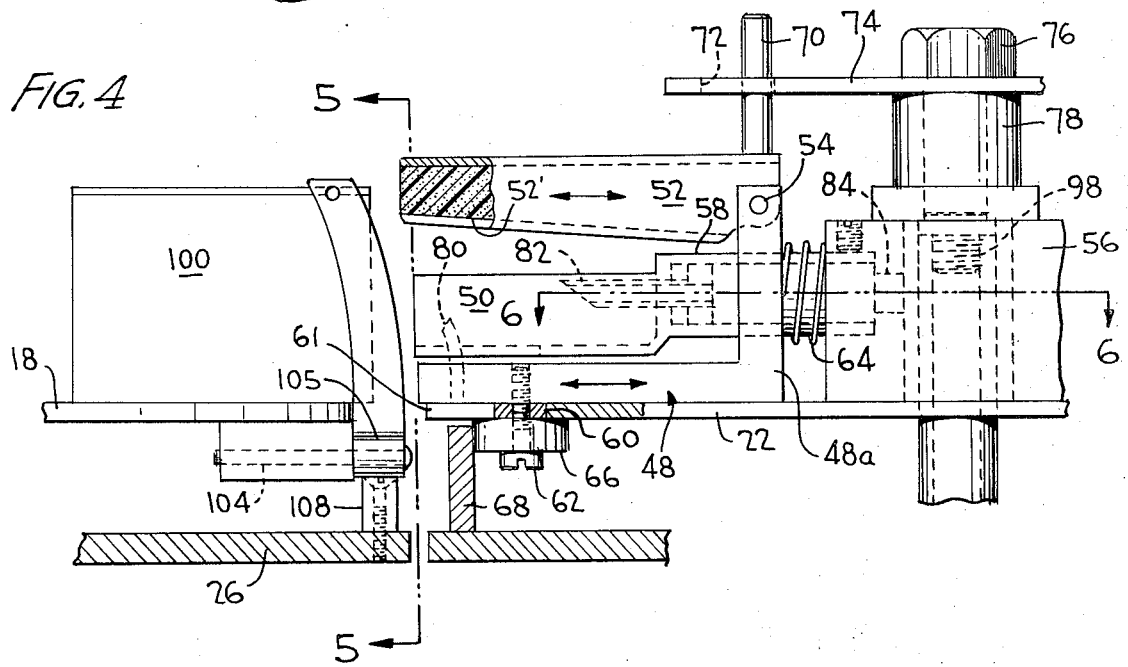
FIG. 4 is a fragmentary side elevation of the mechanism shown in FIG. 3.
Figure 5A:
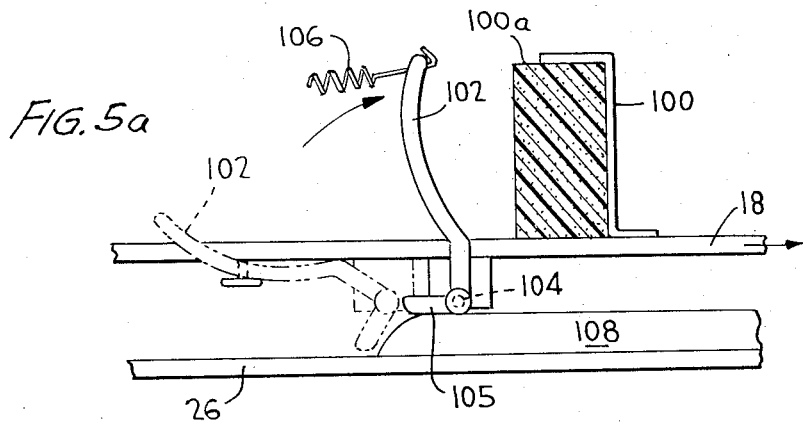
FIG. 5 is an elevational view of the movable head gripper means.
Figure 5B:
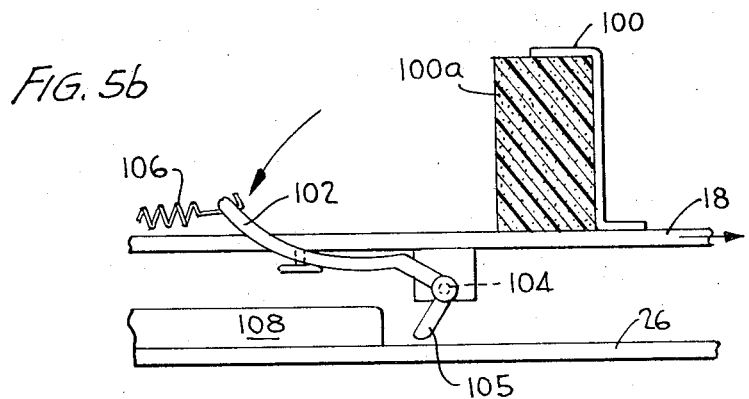
Figure 6:
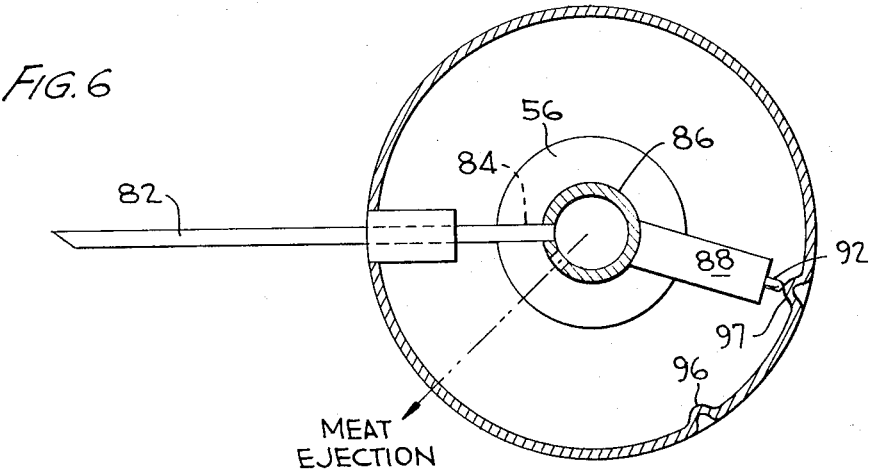
FIG. 6 is a diagrammatic view of the air control valve and the cam means for controlling same.

As is best shown in FIG. 4, a suitable means is provided for relatively closing the upper and lower grippers 50 and 52 responsive to their radial inward or retraction movement. Such means is exemplified by an upwardly projecting lever 70 affixed to the pivoted end of the swingable upper gripper 52 for swinging movement within the limits of a slot 72 in a control place 74. The plate 74 is affixed to the disk 22 in spaced relation thereabove as by means of the bolt or fastener 76 extending through the control plate and thence through a spacer or bushing 78 for threaded reception in the upper end of the hub 56 of the disk 22. Thus, with the grippers 48 and 52 in their radially inward or closed position, as shown in full lines in FIGS. 3 and 4, the retraction movement and ensuing abutment of the lever 70 with the inner end of the slot 72 will have swung the upper gripper 52 downwardly about its pivot 54 for operative engagement with a crawfish positioned within the recess 50 of the lower gripper on the receiver 48. On the other hand, when the coating cam means permit outward movement of the grippers 48, 52 under the influence of the spring 64, the engagement by the lever 70 of the outer end of the slot 72 will cause an upward swinging of the upper gripper 52 to release or disengage the crawfish.

A deveining pin 80 affixed to the horizontal bottom of the receiver or gripper 48 projects upwardly thereabove and well into the recess 50 at a location adjacent the open outer end of the recess. The upwardly directed pointed end of the pin 80 is adapted to penetrate the shell and meat of a crawfish substantially at the juncture of the head and tail sections of its shell when the latter is inverted and manually positioned with the tail section received in the recess 50 and the head section of the crawfish projecting radially outwardly from the recess.

Means for ejecting the meat from the shell and for thereafter discharging the emptied shell from the recess 50 of the receiver is exemplified by a radially directed nozzle 82, the free outer end of which is pointed and positioned for penetration of the shell of a crawfish as the latter is impaled on the sharpened nozzle 82 by radial retraction of the tail grippers 48 and 52, with respect to the radially fixed nozzle 82.

The nozzle 82 is conveniently supported and projects radially outwardly from the free end of the radial guide arm 58, which arm is tubular and serves as a means for placing the nozzle 82 in communication with a valve port 84 opening radially into the interior of the cylindrical hub 56 for communication with a cylindrical conduit 86 extending upwardly through the tubular rotary shaft 24. The lower end of this conduit 86 communicates through a normally closed control valve 88 with a supply line 90 for a pressurized fluid such as air. The control valve 88 may be of any conventional and commercially available type having a normally resiliently projected valve stem 92 adapted for spring loaded engagement with the inner periphery of a control cam 94 of generally cylindrical configuration coaxially affixed to the lower face of the driven sheave 46 for rotation with the shaft 24 and disk 22, and provided with one or more radial projections 96 on its inner face adapted to depress the valve stem 92.

If desired, the upper free end of the fluid conduit 86 and the hub 56 of the disk 22 may cooperate with each other to function as the stator and rotor, respectively, of a conventional rotary valve, the conduit 86 being formed with ports 85, adapted to register at predetermined angular positions of the disk 22 to thus discharge a strong jet or blast of fluid through the nozzle 82 at the same angular location or locations at which the valve stem 92 is depressed by the respective cam projections 96 and 97, respectively.

It is to be noted that the radial projection 96 of the control cam 94 is angularly positioned to open the control valve 88 and thus permit the discharge of air or other fluid through the nozzle 82, while the grippers 48, 52 are still closed and in gripping engagement with the tail section of the crawfish, after removal of the head. The air blast will thus completely eject the meat from the tail section, while the latter is firmly held between the grippers 48, 52, the holding action of which will be supplemented by the action of the deveining pin 80. Since the deveining pin 80 penetrates the meat of the crawfish, it will exert a tearing action on the latter incident to the ejection of the meat, thus to expose the sand vein of the crawfish to the air blast so that it will be removed and separated from the meat, being discharged through a different trajectory than the relatively heavier meat.

As has already been explained, the deheading disk 18 rotates in opposition to the tail disk 22 and in synchronized relation therewith and is provided with cooperating grippers 100 and 102, respectively, for relative closing and opening movement toward and away from each other, respectively.

The pairs of grippers 48, 52 and 100, 102 are thus supported by the Disks 22 and 18 for movement through tangentially related orbits, and positioned to move abreast of each other in the same direction at the point of tangency.

The head grippers 100 and 102 normally are spread apart in opened position for reception between them of the head end or section of a crawfish carried by the tail grippers 48 and 52 as the pairs of grippers move toward their point of tangency, to be thereafter closed or put into gripping engagement with the head section and to remove said section as the respective head grippers and tail grippers thereafter move apart after rotating beyond their point of tangency, or in other words, closest point of approach.

In the preferred embodiment, the head gripper 100 is fixed to the deheading disk 18 for rotary movement with the latter and its substantially radial rear edge is preferably covered with a resilient pad or cushion of a suitable material 100a for frictional gripping engagement with the head of the crawfish.

The movable head gripper 102 essentially comprises an upwardly projecting rigid member, preferably in the form of a thin rigid plate pivoted to the disk 18 for pivotal movement about a horizontal axis 104 extending substantially radially to the disk 18. The operative upper end of the movable gripper 102 is thus swingable toward and away from the stationary gripper 100 for clamping engagement with the head of a crawfish placed between the grippers and is normally swung to a retracted or inoperative position by a suitable retraction spring 106. The movable gripper 102 is provided with a control arm or follower 105 extending radially to its pivot 104, to function as a cam follower for operative engagement with the upwardly presented surface of a cam track 108 of arcuate configuration concentric to the disk 18 positioned to engage the depending lower end of the movable gripper 102 and swing the same into gripping engagement with the head of a crawfish substantially as the disks 18 and 22 reach the rotational positions shown in FIGS. 1 and 3. Cam track 108 is fixedly supported by a plate 109 affixed to bearing 30. During subsequent rotation of the disk 18, the depending lower end of the movable gripper 102 slides along over the upwardly presented operative surface of the cam track 108 to maintain the grippers 100 and 102 in gripping relation with the crawfish head until the head section of the shell will have been detached from the tail section thereof, following which the cam track 108 terminates to permit release of the grippers 100 and 102 and subsequent discharge of the head shell section from which the meat will have been withdrawn due to its stronger attachment to the tail section.

For discharging the empty head shell section from the disk 18 after the head section has been released by the grippers 100 and 102, there is provided a fluid nozzle 110 supported above and coaxially of the disk with its discharge end directed radially toward the desired angular location at which the head shell sections are to be discharged. The nozzle 110 is supplied with air through a conduit 112 which extends upwardly through the hollow shaft 20 for the disk 18 and has its lower end in communication with the discharge side of the control valve 88 earlier described.

OPERATION

Figure 2:
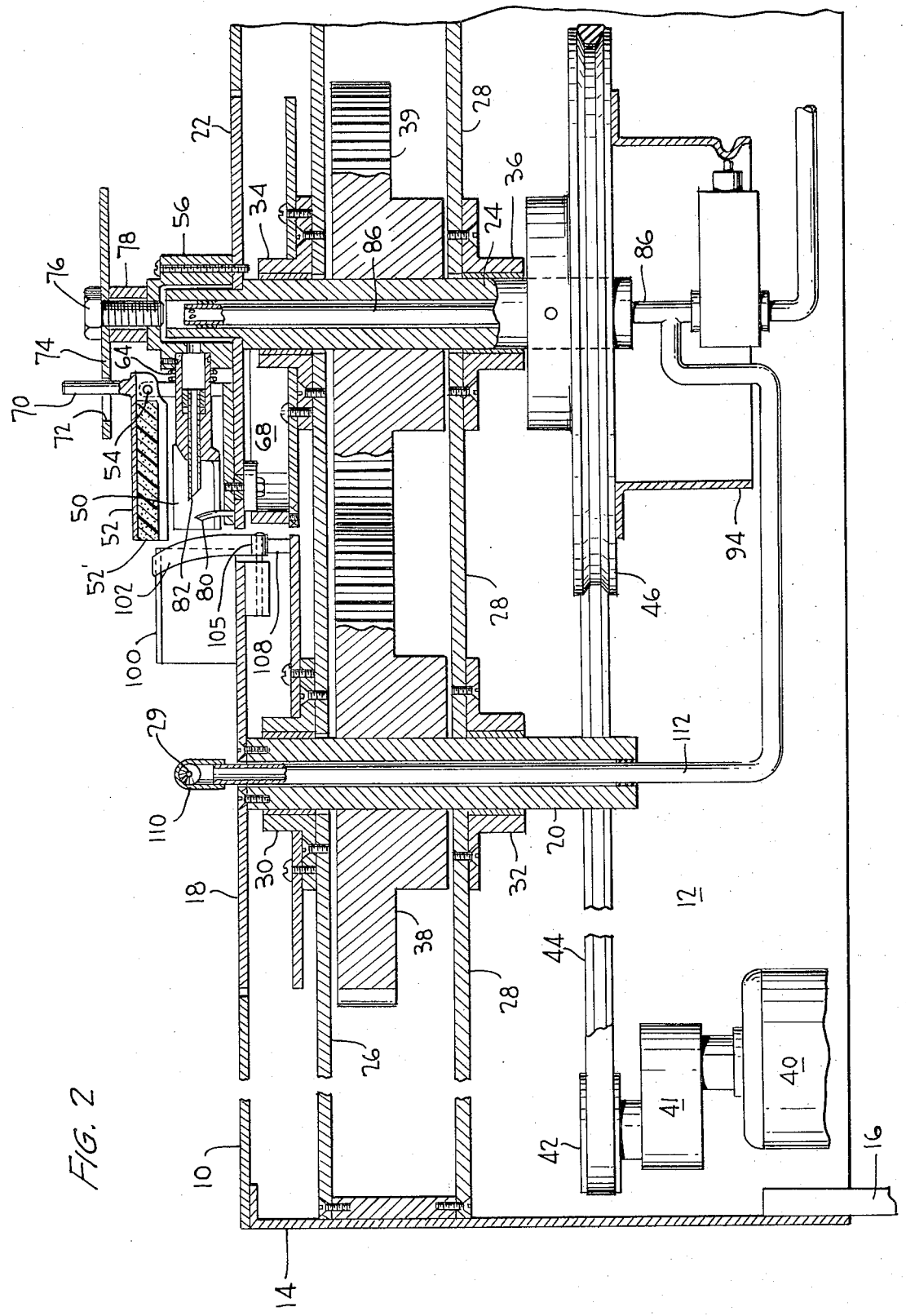
FIG. 2 is a vertical section on the line 2—2 of FIG. 1.

In the overall operation of the invention, a crawfish will be placed in the receiver or lower gripper 48 of the disk 22 during rotation of the receiver 48 in a clockwise direction between substantially the angular locations designated by the letters A and B in FIG. 1, such location being on the side of the disk 22 remote from the cooperating disk 18. Such loading of the crawfish into the receiver 48 may be achieved manually or through suitable automatic loading mechanism constituting no part of the present invention.

It is important, however, that the crawfish be placed in the recess 50 of the receiver in an inverted or upside-down position with its head projecting radially outwardly through the open end of the recess 50 and its tail section received in said recess. The crawfish is pressed downwardly onto the deveining pin or spike 80 in a manner such that the latter penetrates the had shell of the tail approximately where it attaches to the body and also partially penetrates the meat. It will be appreciated at this time that the receiver 48 and upper gripper 52 are both fully radially outwardly projected by the spring 64 (FIG. 4.) so that the upper or movable gripper 52 is in its fully raised or open position for reception of the crawfish.

As the receiver 48 reaches substantially the angular position B in FIG. 1, the receiver 48 will commence its radially inward or retraction movement, due to engagement of its follower roller 66 with the eccentric portions of the cam track 68. Such retraction is completed by the time the angular position C is reached. Such retraction of the receiver 48 and the ensuing abutment of the lever 70 with he inner end of slot 72 in control plate 74 will swing the upper gripper 52 downwardly about its pivot 54 into gripping engagement with the tail section of the crawfish to retain same on the upwardly projecting deveining pin 80 which, in addition to its deveining function, firmly holds the tail section of the crawfish against endwise withdrawal.

Moreover, as the receiver 48 and its associated movable gripper 52 are retracted radially inwardly and closed, such retraction movement causes the pointed free end of the fixed fluid nozzle 82 to penetrate the shell.

After the tail section and grippers 48 and 52 are fully retracted and closed upon arrival at the angular location C, they thereafter remain closed and in gripping engagement with the crawfish throughout the angular movement from C to F in FIG. 1, coextensively with the interengagement of the cam follower 66 with the concentric portion of the cam track 68.

The cooperating grippers 100 and 102 of the deheading disk 18 are angularly located on that disk for arrival at a position between and substantially aligned with the rotational axes of the respective disks contemporaneously with the arrival of the grippers 48 and 52, so that the two pairs of grippers for at least a portion of their respective angular movement (or in other words, during movement past their point of tangency) are directly opposed to each other and move in substantially the same peripheral direction at similar peripheral velocities.

As the grippers 100 and 102 of the deheading disk approach their said point of tangency or position of nearest approach to the tail grippers 48, 52, they will be then spread apart or released in position for free reception of the radially outwardly projecting head of a crawfish held in the grippers 48, 52 of the disk 22. Then as the two pairs of grippers reach their points of tangency wherein the head of the crawfish is fully insertd between the head grippers 100, 102, the depending end or actuating arm of the movable gripper 102 will engage its associated cam track 108 to be swung by the latter toward the stationary gripper 100, thus to firmly clamp the head of the crawfish between these grippers and to maintain it so clamped during subsequent rotary movement of the disks, whereby the divergent angular movement of the respective pairs of grippers with their respective disks will pull the head portion of the crawfish shell free from the body thereof. The meat, which has a stronger attachment to the tail end of the shell, is withdrawn from the head end of the shell by virtue of such attachment.

The cam track 108 is discontinued at substantially the angular location E to release the head grippers after the meat has been withdrawn from the head section of the shell.

The tail grippers 48, 52, however, remain closed and in gripping engagement with the tail section until such time as the tail section grippers have moved angularly substantially to the location F in FIG. 1. During the course of their movement from E to F, the air control valve 88 (FIG. 2) is opened briefly as its valve stem 92 is depressed by passing over a suitably located valve actuating projection 96 within the control cam 94. Thus, pressurized air from the air supply 90 is admitted through the control valve 88, conduit 86 and rotary valve 56 for discharge through the nozzle 82 to thus eject the meat from the tail section of the crawfish shell. As the meat is thus ejected or forced radially outwardly from the shell onto the surrounding horizontal surface of disk 22, the back section of the meat is split open and the sand vein is ripped out by the deveining pin 80 to then be blown away by the air blast. Because of the substantial difference in mass as between the meat and the sand vein, the latter normally will be separated from the meat by being blown off of the edge of the surrounding table surface.

At the angular location F, the concentric portion of the control cam 68 terminates and the cam follower 66 is disengaged therefrom so that the receiver 42 is then projected outwardly by its spring 64, causing the movable upper gripping member 52 then to be retracted by the ensuing cooperation between its actuating lever 70 and control plate 74. At the same time, the projection or radial outward movement of the raceiver 42 will substantially withdraw the tail section of the shell radially outwardly off of the sharpened nozzle 82 on which it has been impaled. Thereafter, and before the location A is again reached, the control valve is again opened by interengagement of its valve stem 92 with a valve actuating projection 97 in the control cam 94. The ensuring blast of the air through the nozzle 82 will thus discharge the emptied tail shell section from the receiver 42. At the same time, a blast of air will issue from the nozzle 110 of the disk 18 to discharge the empty head shell section radially outwardly from the disk 18, the grippers 100 and 102 of the disk 18 having been earlier disengaged from the head shell section as earlier mentioned.

After the receiver 42 rotates past the angular location A in FIG. 1, it is in readiness for reception of a further crawfish and for the commencement of a repeated operational cycle similar to that just described.

Having thus described my invention, I claim:

1. A crawfish peeler comprising a pair of rotors and means supporting said rotors for rotation about relatively spaced axes with peripheral portions of said rotors adjacent to each other, means rotating said rotors at equal peripheral velocities in opposite directions, a pair of tail grippers carried by one said rotor adjacent its periphery and guided thereon for movement radially to the rotational axis of the rotor, said tail grippers also being supported for relative movement toward and away from each other into and from gripping engagement with a crawfish placed between them, means for relatively separating said grippers as they move radially outwardly on said one rotor and means for urging said grippers toward each other as they are moved radially inwardly on their rotor to firmly grip the tail section of a crawfish placed between them with the head of said crawfish projecting radially outwardly from between the said grippers, a pair of head grippers carried at the outer periphery of the other said rotor for movement toward and away from each other into and from firm gripping engagement with the head of a crawfish engaged by said tail grippers, said head grippers and said tail grippers being relatively positioned on their respective rotors for movement abreast of each other and in the same peripheral direction at periodic intervals on passing through their respective points of closest proximity to each other, said head grippers being normally spread apart in open position to receive between them the head of a crawfish engaged by said tail grippers during the approach of said pairs of grippers toward their point of nearest proximity, means for relatively closing said head grippers to operatively engage the head of the crawfish substantially as said pairs of grippers pass through their proximity point whereby the continued movement of said rotors subsequent to such proximity point and the resulting separation of said pairs of rotors after passing such point will cause said head grippers to remove the head from the crawfish, leaving the meat therein, means operative upon further rotary movement of said tail rotor for removing the meat from said crawfish, and means for opening both sets of grippers to release the shell segments therefrom before they again return to their said point of closest proximity, said crawfish peeler further including a deveining pin carried by one of said tail grippers and projecting generally toward the other said gripper for penetration of a crawfish, the tail of which is held between the said grippers to be impaled on the said pin incident to closing of the grippers, a nozzle having a radially outwardly directed sharpened end fixedly located between said grippers adjacent the radially inner extremity thereof when the grippers are in their radially projected open position, to penetrate the shell and into the meat of the crawfish, and means for supplying a pressurized fluid to said nozzle.

2. A crawfish peeler as defined in claim 1, in which one of said tail grippers comprises a receiver formed with an upwardly and radially outwardly opening recess for reception of crawfish, and is guided for radial movement on its associated rotor, the other said tail gripper being pivotally connected to said receiver at the inner end of said recess and projecting radially outwardly from said pivotal connection for vertical swinging movement toward the recess to clamp the crawfish against the bottom thereof, said deveining pin projecting upwardly above the bottom of said recess to have the crawfish impaled thereon by said other gripper.

3. A crawfish peeler as defined in claim 2, in which said nozzle is radially fixed near the inner end of said recess and directed radially outwardly for penetration of the shell of a crawfish incident to the radial inward movement of said receiver.

4. A crawfish peeler as defined in claim 3 including resilient means normally urging said receiver radially outwardly and cam means for urging said receiver radially inwardly to a retracted position each time it approaches said point of proximity to the head grippers and for thereafter maintaining said receiver in its retracted position for a limited extent of angular movement past said point.

5. A crawfish peeler as defined in claim 4 including an operating lever rigidly affixed to said other tail gripper and projecting outwardly from the pivot thereof, and means abutting against said lever for closing said other tail gripper incident to radial retraction of said receiver.

6. A crawfish peeler as defined in claim 5 including a control plate affixed to said rotor and formed with a slot through which said lever projects, said lever abutting one end of the slot for closing the other tail gripper responsive to radially inward movement of the receiver and abutting the other end of said slot to relatively open the said tail grippers incident to radially outward movement of the said grippers.

* * * * *